United States Patent
Alford et al.

[15] 3,659,468
[45] May 2, 1972

[54] SLOTTED WAVEGUIDE CARRIAGE MOVEMENT APPARATUS

[72] Inventors: Andrew Alford, Winchester; Pasquale Barbagallo, Bedford, both of Mass.

[73] Assignee: said Alford, by said Barbagallo

[22] Filed: Dec. 10, 1969

[21] Appl. No.: 883,822

[52] U.S. Cl. ..................................... 74/89.22, 333/1
[51] Int. Cl. ........................................ F16h 27/02
[58] Field of Search ........................ 74/89.22; 333/1

[56] References Cited

UNITED STATES PATENTS

| | | | |
|---|---|---|---|
| 2,884,788 | 5/1959 | Clark | 74/89.22 |
| 3,039,318 | 6/1962 | Clarke | 74/89.22 |

OTHER PUBLICATIONS

Montgomery: Technique of Microwave Measurements 1947 PP. 490 & 494.

Primary Examiner—Milton Kaufman
Assistant Examiner—Wesley S. Ratliff, Jr.
Attorney—Wolf, Greenfield and Sacks

[57] ABSTRACT

A high frequency slotted measuring waveguide has a probe carriage that is moved, by a dual-cable, pulley arrangement, along calibrated ways of the waveguide. The apparatus includes a supported lever-fulcrum arrangement adapted to equalize the tensions in both cables, thereby substantially eliminating any twisting of the carriage during its translational movement.

10 Claims, 2 Drawing Figures

INVENTORS
Andrew Alford,
BY Pasquale Barbagallo
Wolf, Greenfield Hieken + Sacks
ATTORNEYS

SLOTTED WAVEGUIDE CARRIAGE MOVEMENT APPARATUS

BACKGROUND OF THE INVENTION

The present invention relates in general to slotted waveguides which include slotted coaxial transmission lines and in more particular is concerned with an improved carriage translation means for use with slotted waveguides which include slotted lines.

Slotted waveguides have been used for making impedance measurements of circuits to which they have been coupled. A probe is supported by a carriage which is adapted for movement on calibrated ways. The probe, which extends through the slot into the waveguide, detects the intensity of the field within the wave guide. Even a slight twisting of the carriage with respect to the calibrated ways can cause inaccuracies in measurements such as impedance measurements.

Accordingly, it is an important object of this invention to provide a slotted measuring waveguide with an improved carriage movement mechanism.

It is another object of the invention to provide a slotted waveguide having a carriage movement mechanism that prevents twisting motion of the carriage as it translates.

It is a further object of the invention to achieve the preceding objects relatively inexpensively.

SUMMARY OF THE INVENTION

According to the invention, a slotted measuring waveguide is provided with a probe-securing carriage that is adapted for travel along a path that is substantially parallel to the slotted waveguide. The measuring waveguide is provided with means for moving the carriage, and means coupled to the cables for equalizing the tensions on the two cables, thereby preventing twisting of the carriage as it translates. In one embodiment, the carriage moving means includes a dual-cable, pulley arrangement which is manually operable and the equalizing means includes a supported lever-fulcrum arrangement that is adapted to instantaneously equalize the tensions on both cables.

Numerous other features, objects and advantages of the invention will become apparent from the following specification when read in conjunction with accompanying drawings in which:

DETAILED DESCRIPTION

Figure 1:
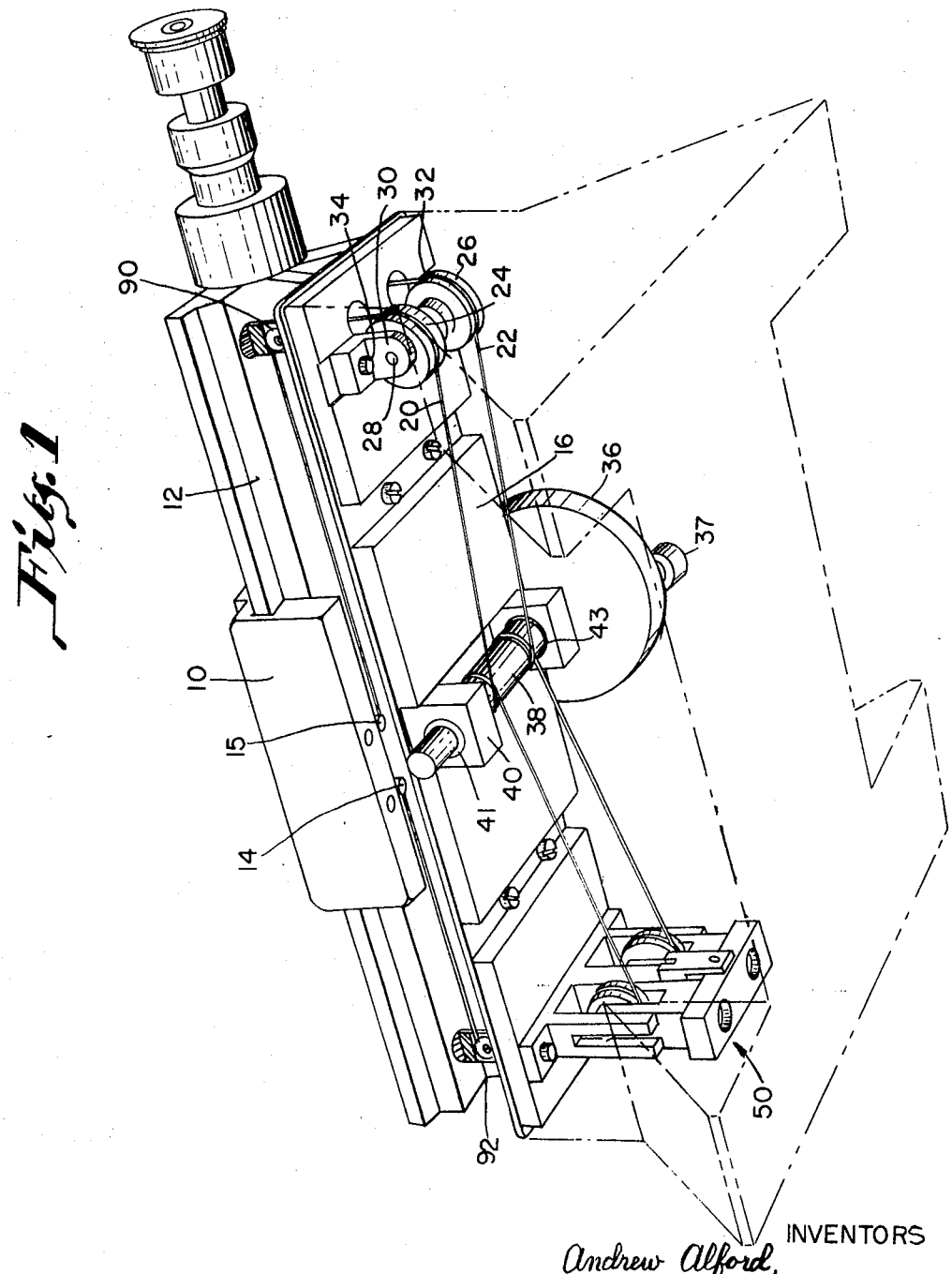
FIG. 1 is a bottom perspective cutaway view showing the slotted measuring waveguide and the equalizing means.

Referring to FIG. 1, there is shown a bottom perspective view of the slotted waveguide with the housing 11 cutaway to show the carriage movement apparatus. Carriage 10 which contains a detector probe (not shown) mates with slotted waveguide block 12 and is adapted for translational movement along block 12. The movement of carriage 10 is provided in part by cables 20 and 22, which are attached to the carriage 10 on opposite sides of the waveguide centerline by means of cable securing members 14 and 15. Only the cable securing members associated with cable 20 are shown in FIG. 1. The cables 20 and 22 move through a series of grooved, nylon pulleys and also move through equalizing means 50. In one embodiment a stainless steel 0.024 diameter braided cable is used. Means 50 is shown in an exploded view in FIG. 2 in more detail that that indicated in FIG 1.

Circular handle 36 which includes rotating knob 37, couples to shaft 38. The cables 20 and 22 are wrapped around shaft 38 two or three times and are retained in a taut position. Shaft 38 is mounted in shaft support members 40 and 42 which are, in turn, suitably secured to support plate 16. Bushings 41 and 43 are respectively contained within members 40 and 42 and provide for the easy rotation of shaft 38.

An operator of the apparatus merely rotates knob 37, thereby causing a rotation of shaft 38 and an attendant pulling of the cables 20, 22 in either direction.

The pulleys 90 and 92 which are shown in cross section in FIG. 1 have the cables 20 passing through a groove therein. A second set of grooved pulleys (not shown) rotatably secures to the other side of block 12. These pulleys have cable 22 located in the groove provided there for. As previously mentioned, cable 22 is attached to carriage 10 on the opposite side by means of a second set of cable securing members 14 and 15.

The cables 20 and 22 also pass through nylon pulleys 24 and 26 which have grooves therein adapted to accommodate their respective cables. The pulleys 24 and 26 are mounted upon shaft 28. Shaft 28, in turn, is housed at its ends within shaft support members 30 and 32. Members 30 and 32 are secured by means of screws 34 to support plate 16.

Figure 2:
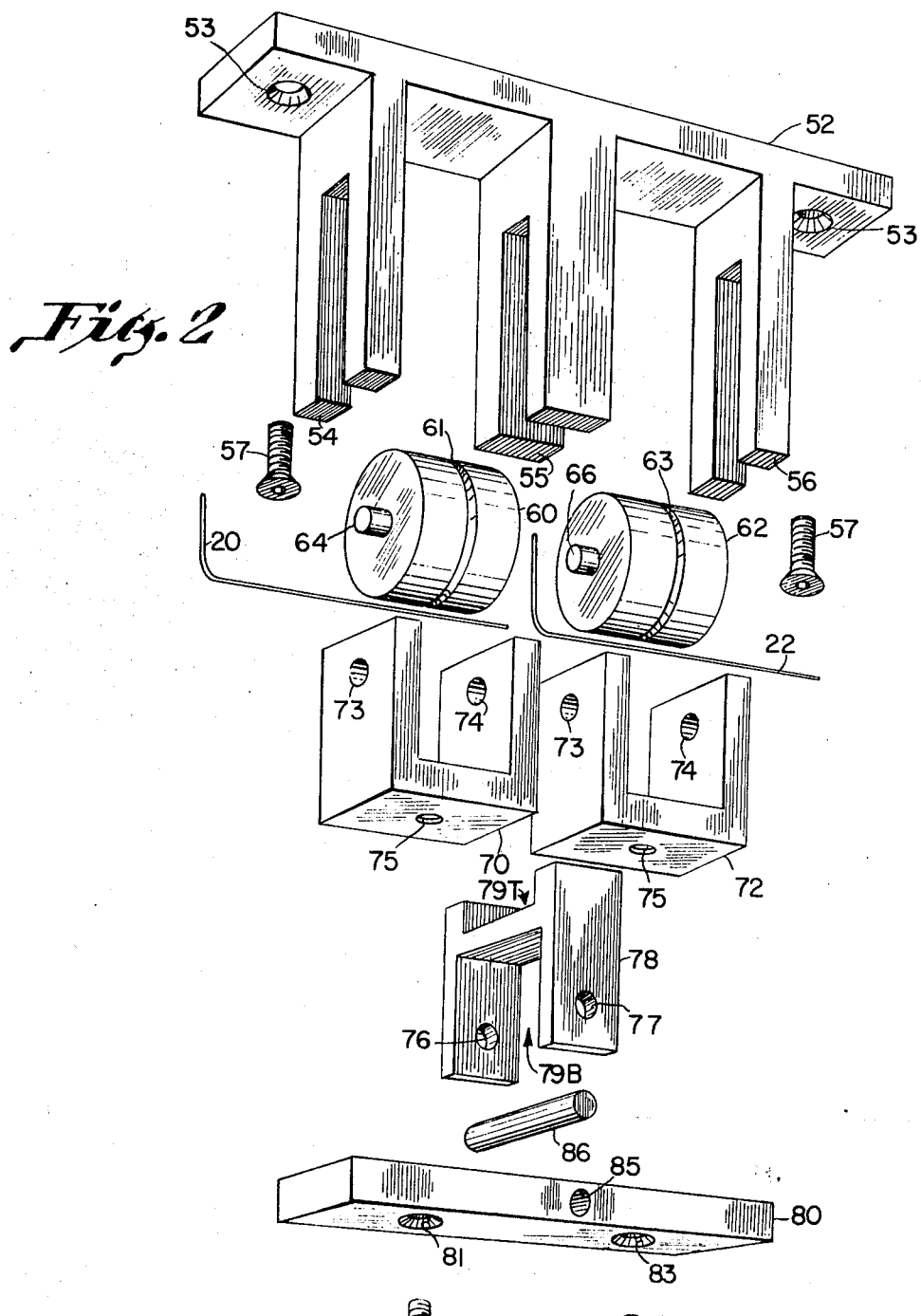
FIG. 2 is an exploded view of the equalizing means.

Referring now to the exploded view of FIG. 2, there is shown in detail, the equalizing means 50. Tension equalizing means 50 includes nylon pulleys 60 and 62, which are capable of rotational movement and also capable of limited up and down translational movement. It is the translational movement that compensates for unequal tensions in the respective cables.

Pulley support member 52 is secured to support plate 16 by means of screws 57, which screw into plate 16 through holes 53 in support member 52. Support member 52 also includes a trio of two-pronged forks 54, 55 and 56, which are integrally formed with the remainder of support member 52. The nylon pulleys 60 and 62 include respective grooves 61 and 63 through which cables 20 and 22 pass. The pulleys 60 and 62 have respective shafts 64 and 66 secured therethrough. The shafts 64 and 66 fit through the holes 73, 74 of respective yolks 70 and 72. The shafts 64 and 66 when assembled fit within the open portions between forks 54, 55 and 56. During assembly, yolks 70 and 72 fit snugly between the facing surfaces of forks 54, 55 and 56.

H-shaped fulcrum support 78 has a recess 79T on its top surface that mates with the bottom surface of fork 55. Support member 78 has holes 76 and 77 disposed through its bottom portion, which are adapted to securely accommodate shaft 86. Shaft 86 also passes through hole 85 in lever member 80. Screws 82 and 84 passes through the threaded holes 81 and 83 in member 80 and are adapted to screw into threaded holes 75 in yolks 70 and 72, respectively.

The exploded view of FIG. 2 is shown assembled in FIG. 1 with the cables 20 and 22 firmly affixed in position. When handle 36 is rotated, carriage 10 should translate along waveguide block 12. If there is even a slight amount of twisting motion imparted to carriage 10 during this movement, the tension on one of the cables will be instantaneously larger than the tension on the other cable. This will cause a swivelling of lever member 80 about fixed shaft 86 and a subsequent equalizing of the tensions of the two cables. This action occurs regardless of the direction that the carriage is moved.

Screws 82 and 84 are used to control the taughtness of the cables and are initially used to adjust the position of lever 80 so that it is approximately parallel to the shafts 64 and 66. This particular setting is, however, merely a convenience for the arrangement operates properly even when lever 80 is at a slight angle. As previously mentioned, lever 80 functions to insure equal tensions in the driving cables 20 and 22. If one cable develops more slack than the other, lever 80 immediately turns on shaft 86 in the direction which would equalize the tensions.

Having now described the invention in detail, certain modifications are contemplated as falling within the scope of the invention. For example, instead of using a cable having a circular cross section, as shown, other cable configurations could be used. A ribbon type cable could be used. Also, one way has been disclosed for facilitating the movement of the cables. Other ways could also be readily envisioned. A dual shaft arrangement could be used, for example, where the cable passes between the two shafts, one of which is fabricated of a flexible material.

Having now described certain modifications of the invention, other modifications and uses of and departures from the specific embodiments described herein may be made by those skilled in the art without departing from the inventive concepts. Consequently, the invention is to be construed as embracing each and every novel feature and novel combination of features present in or possessed by the apparatus and technique herein disclosed.

What is claimed is:

1. A slotted measuring waveguide having a movable probe-securing carriage that travels along ways of said waveguide, comprising;
   means for moving said carriage including at least one pair of rotatably supported pulleys and a pair of belts extending over respective pulleys and attached at their ends to said carriage,
   and means engaging said belts for preventing twisting of said carriage as it travels along said ways,
   said means for preventing twisting including movable means for automatically equalizing the tensions in said belts,
   wherein said means for moving includes a rotatable shaft having said pair of belts spacedly wrapped thereabout whereby said shaft is rotatable to in turn cause movement of said carriage.

2. A slotted measuring waveguide as defined in claim 1 wherein said pulleys each have a belt accommodating groove disposed about the periphery thereof.

3. A slotted measuring waveguide as defined in claim 1 wherein said equalizing means includes a supported lever-fulcrum arrangement including first and second pulleys,
   said arrangement for instantaneously equalizing the tensions of said belts.

4. A slotted measuring waveguide having a movable probe-securing carriage, that travels along ways of said waveguide comprising;
   means for moving said carriage including at least one pair of rotatably supported pulleys and a pair of cables extending over respective pulleys and attached at their ends to said carriage,
   and means engaging said cables for preventing twisting of said carriage as it travels along said ways,
   said means for preventing twisting including moveable means for automatically equalizing the tensions in said cables,
   wherein said equalizing means includes,
   first and second yoke members adapted to hold said first and second pulleys,
   each said yoke members having a threaded hole disposed in its bottom surface,
   a fixed fulcrum, a swivelable lever member having first and second holes therein,
   and adjusting screws that fit in said first and second holes and in each threaded hole of said yoke,
   the combination being adapted to equalize the tensions on said cables.

5. A slotted measuring waveguide having a movable probe-securing carriage that travels along ways of said waveguide comprising;
   means for moving said carriage including at least one pair of rotatably supported pulleys and a pair of belts extending over respective pulleys and attached at their ends to said carriage,
   and means engaging said belts for preventing twisting of said carriage as it travels along said ways,
   said means for preventing twisting including moveable means for automatically equalizing the tensions in said belts,
   wherein said equalizing means includes,
   a lever member fixed in position at a fulcrum point,
   first and second pulleys each engaging one belt of said pair of belts,
   means for separately supporting said first and second pulleys for rotation and in a manner to permit limited radial movement,
   and means intercoupling opposite ends of said lever member and a means supporting said first and second pulleys.

6. A slotted measuring waveguide as defined in claim 1 wherein said means for equalizing the tensions in said belts includes a pair of moveable belt supporting pulleys each of which is suitably supported for limited radial movement, and a pivotal member coupled to the pulleys.

7. In a slotted measuring waveguide apparatus, a moveable probe-securing carriage that travels along ways of said apparatus comprising;
   a first cable secured at its ends to one side of the carriage,
   a first plurality of spaced pulleys for carrying the first cable,
   means for supporting the first plurality of pulleys for rotation,
   a second cable secured at its ends to another side of the carriage,
   a second plurality of spaced pulleys for carrying the second cable,
   means for supporting the second plurality of pulleys for rotation,
   means coupled to both cables for causing the cables to move thereby moving the carriage,
   a pair of tension-equalizing pulleys, one engaging the first cable and the other engaging the second cable,
   means for separately supporting said pair of pulleys for rotation and in a manner to permit limited radial movement,
   a lever member fixed in position at a fulcrum point,
   and means intercoupling opposite ends of said lever member and the means supporting said pair of pulleys,
   whereby an increase in tension on the first cable causes the lever member to pivot in a direction to cause an increase in tension on the second cable substantially concurrently therewith.

8. A slotted measuring waveguide apparatus as defined in claim 7 wherein the means for separately supporting the pair of pulleys includes a pair of U-shaped members having threaded holes disposed in a bottom portion thereof,
   said lever member having holes disposed in its opposite ends,
   and wherein said means intercoupling opposite ends of said lever member and the means supporting said pair of pulleys includes a pair of screws each engageable with the lever member and the U-shaped member to thereby adjust the position of said tension-equalizing pulleys.

9. In a device having a moveable carriage that travels along guide ways, a pair of spaced cables each with ends that attach to opposite sides of the carriage, cable supporting means associated with each cable and including a plurality of spaced suitably supported pulleys, and means coupled to both cables for causing the cables to move thereby in turn moving the carriage, the improvement comprising;
   means coupled to each cable intermediate its ends for equalizing the tensions in said cables,
   wherein the means for equalizing is moveable to a limited extent to facilitate such equalizing,
   wherein said means for equalizing the tensions in said cables comprises,
   a support member secured to said device,
   a pair of tension-equalizing pulleys each engaging one cable of said pair of spaced cables and each including a fixed shaft,
   a yoke member for each tension equalizing pulley and including holes for accommodating the shaft of each pulley,
   said support member having a trio of depending forks defining spaced areas for accommodating said yokes,
   a fulcrum support member resting against the middle fork of the support member,
   a fulcrum plate pivotably engaging the fulcrum support member,
   each said yoke having a threaded hole disposed in its bottom surface and said lever member having first and second holes disposed therein, and a pair of adjusting screws that fit in said first and second holes of said lever member and in each threaded hole of the yokes, the combination being adapted to equalize the tensions on the cables so that when the tension in one of the cables increases the lever member pivots in a direction to cause an increase in the tension on the other cable substantially concurrently therewith.

10. In a device having a moveable carriage that travels along guide ways, a pair of spaced belts each with ends that attach to opposite ends of the carriage so that the opposite ends of each belt are substantially in line, belt supporting means associated with each belt and including a plurality of spaced suitably supported pulleys, and means coupled to both belts for causing the belts to move thereby in turn moving the carriage, the improvement comprising;

a pair of tension-equalizing pulleys, one engaging each belt, means for supporting said pair of pulleys for rotation and in a manner to permit limited radial movement, a lever member fixed in position at a fulcrum, and means intercoupling opposite ends of said lever member and the means supporting said pair of pulleys, whereby an increase in tension on one belt causes the lever member to pivot in a direction to cause an increase in tension on the other belt substantially concurrently therewith.

* * * * *